United States Patent Office 3,063,779
Patented Nov. 13, 1962

3,063,779
PROCESS FOR THE MANUFACTURE OF DYESTUFFS
Georg Rösch, Leverkusen, and Helmut Klappert and Karl-Heinz Gehringer, Koln-Stammheim, Germany, assignors to Farbenfabriken Bayer Aktiengesellschaft, Leverkusen, Germany, a corporation of Germany
No Drawing. Filed Nov. 26, 1958, Ser. No. 776,422
Claims priority, application Germany Dec. 2, 1957
7 Claims. (Cl. 8—1)

This invention relates to novel dyestuffs and to a process for their production.

It has been found that water-soluble dyestuffs are obtainable by quaternation of water-soluble Bz-aza-phthalocyanines, otherwise known as 2,3-pyridino-tetra-aza-porphines or as 2,3-pyridinoporphyrazines.

The Bz-aza-phthalocyanines used for the process according to the invention are obtainable by known methods, for example according to the process of German patent specification No. 696,590. It is not necessary that the phthalocyanine molecule contains 4 Bz-aza(2,3-pyridino) radicals, but dyestuffs containing two or three of this radical in the molecule are likewise suitable.

The Bz-aza-phthalocyanines may contain metals such as copper, cobalt or nickel, or they may also be metal-free.

For quaternation there may be used the usual quaternizing agents such as alkyl sulphates, arylsulphonic acid alkyl esters, aryl-alkyl halides, epichlorhydrin or monochloracetic acid. When carrying out the new process, it is necessary to use at least two mols of quaternizing agent per mol of Bz-aza-phthalocyanine, in order to obtain readily water-soluble products. If desired, it is also possible to use an excess of quaternizing agent. The quaternation is expediently carried out at a slightly elevated temperature, in general, temperatures between 60 and 200° C. being suitable, but it also possible to work at room temperature, the quaternation taking more time in this case. The quaternation may moreover be effected in the presence of solvents having a good dissolving power for Bz-aza-phthalocyanines. Suitable are for example formic acid, acetic acid, succinic acid, malonic acid or mixtures of these acids.

The working up of the water-soluble Bz-aza-phthalocyanines can be carried out in usual manner, for example by precipitation with ether or acetone and subsequent filtration.

From the water-soluble quaternized Bz-aza-phthalocyanines there may be obtained water-insoluble dyestuffs by heat treatment.

Although the water-insoluble dyestuffs are obtainable from the water-soluble dyestuffs by heat treatment only, it is expedient in many cases to work in the presence of alkalies, since in this case the formation of water-insoluble dyestuffs proceeds more rapidly. Suitable alkalies are for example alkali metal hydroxides, alkali metal carbonates, alkali metal bicarbonates, alkali metal acetates or ammonia.

The present process is particularly suitable for producing dyeings or prints on textiles with the water-insoluble dyestuffs. These dyestuffs are especially suitable for the dyeing and printing of materials of cellulose or regenerated cellulose. The dyeings and prints may be carried out according to usual methods by leaving the dyeing materials for some time at temperatures of between 20 and 100° C., for example, in aqueous dyebaths containing the water-soluble quaternized dyestuffs. The dyestuffs then draw onto the dyeing materials and are transformed into the water-insoluble dyestuffs at elevated temperatures. The dyeing materials may however also be impregnated with the aqueous dyestuff solutions, for example on the foulard. The dyestuff formation can then be effected in usual manner, for example by a heat treatment such as steaming.

The dyebaths and printing pastes may contain the usual auxiliaries such as dyestuff dispersing agents, levelling agents or wetting agents provided that these agents do not show a strongly alkaline reaction in an aqueous solution. Expediently, neutral to weakly acid or weakly alkaline dyebaths and printing pastes are used for the dyeings and prints. The dyeings and prints thus obtained are expediently subjected to an alkaline treatment with dilute aqueous alkalies. Subsequently, the usual after-treatments are advantageously carried out, for example by treating the dyeings and prints in boiling soap baths. The dyeings from dyebaths may also be varied so that the necessary alkalies are added to the dyebaths immediately after completion of the dyeing or that the alkaline fixation is carried out together with the after-treatment with soap.

If fabrics or fibre materials of silk, or polyacrylonitrile or co-polymers consisting essentially of polyacrylonitrile are to be dyed, weakly acid dyebaths are advantageously used.

The dyestuffs obtainable in this manner from the water-soluble quaternized Bz-aza-phthalocyanines are violet, grey to greenish blue water-insoluble pigment dyestuffs. The shade of the pigments obtained differs the more from the basic non-quaternized water-insoluble Bz-aza-phthalocyanine, the more quaternary groups have been introduced into the Bz-aza-phthalocyanine. The change of shade compared with the quaternized water-soluble Bz-azaphthalocyanines indicates that a re-arrangement has taken place at the pyridine ring. Since from a Bz-tetra-aza-copper phthalocyanine a violet dyestuff is obtained by four-fold quaternation, it may be assumed that the aromatic character of the pyridine ring disappears by the splitting of the quaternary compounds.

The following examples are given for the purpose of illustrating the invention.

*Example 1*

(a) Into 200 parts by weight of molten monochloracetic acid there are introduced at 60° C. with stirring 23.2 parts by weight of Bz-tetra-aza-copper phthalocyanine. The mixture is then stirred at 190° C. for an hour. A blue solution is thus formed which, after cooling, is stirred with 1000 parts by volume of ether or acetone. The separated green dyestuff is filtered off with suction, washed with ether or acetone and dried. A green powder is thus obtained which dissolves in water with a blue colour. The yield is 38 parts by weight.

Instead of Bz-tetra-aza-copper phthalocyanine there may also be used Bz-tri-aza-copper phthalocyanine.

(b) 10 parts by weight of the quaternized dyestuff are heated to boiling temperature in 100 parts by weight of a 10% potassium hydroxide solution for 10 minutes. A reddish violet dyestuff pigment is thus obtained.

Instead of potassium hydroxide there may also be used other alkali metal hydroxides, alkali metal carbonates, alkali metal bicarbonates or alkali metal acetates or an aqueous ammonia solution.

(c) 3 parts by weight of the water-soluble blue dyestuff are dissolved in 2000 parts by weight of water at 50° C. 100 parts by weight of cotton skein yarn are treated in this dyebath at raising temperature for 30 minutes and at 90–100° C. for a further 15 minutes. The yarn is then rinsed and after-treated with a solution of 5–10 parts by weight of sodium carbonate in 2000 parts by weight of water at 100° C. for 15 minutes. The shade changes very rapidly from greenish blue to greyish violet. In order to remove the pigment adhering to the surface the yarn is strongly after-soaped.

(d) A cotton fabric is printed with a printing paste prepared as follows:

3 parts by weight of the quaternized dyestuff are dissolved in 20 parts by weight of water and stirred into 50 parts by weight of wheat starch-tragacanth thickener. After the addition of 2.3 parts by weight of crystalline sodium acetate, the printing paste is made up to 100 parts by weight with 24.7 parts by weight of water. After the usual preliminary drying at 60° C., the dyestuff is fixed on the fibre by neutral or acid steaming in a Mather-Platt ager for 5–10 minutes. After the usual after-treatment a strong violet-black shade of very good fastness properties is obtained.

Example 2

(a) Into 100 parts by volume of approximately 90% commercial formic acid there are introduced with stirring 11.6 parts by weight of Bz-tetra-aza-copper phthalocyanine and 17.6 parts by weight of p-toluene-sulphonic acid ethyl ester. The mixture is then stirred at 100° C. for 3 hours. After cooling, the blue solution of the quarternary compound thus formed is stirred into 500 parts by volume of ether or acetone, the separated dyestuff is filtered off with suction, washed with ether or acetone and dried. The yield is 26 parts by weight.

Instead of formic acid, glacial acetic acid may also be used.

(b) 10 parts by weight of the quaternized dyestuff are heated to boiling temperature in 100 parts by weight of a 10% potassium hydroxide solution for 10 minutes. A clear violet dyestuff pigment is thus obtained.

(c) 100 parts by weight of viscose skein yarn are treated in a solution of 3 parts by weight of the quaternized dyestuff in 2000 parts by weight of water at 50° C. at raising temperature for 30 minutes and at 90° C. for a further 15 minutes. After rinsing, the yarn is soaped with a solution of 3 g./litre of soap with the addition of 1 g./litre of sodium carbonate. After a short time, the shade changes from blue to violet.

Example 3

(a) Into 100 parts by volume of approximately 90% commercial formic acid there are introduced with stirring 11.6 parts by weight of Bz-tetra-aza-copper phthalocyanine and 8.8 parts by weight of p-toluene-sulphonic acid ethyl or methyl ester. The mixture is then stirred at 100° C. for 5 hours. The quaternary compound thus formed is isolated as described in Example 2. The yield is 19 parts by weight.

(b) 10 parts by weight of the quaternized dyestuff are heated in 100 parts by weight of a 10% potassium hydroxide solution to boiling temperature for 10 minutes. A clear bluish violet dyestuff pigment is thus obtained.

(c) 100 parts by weight of natural silk skein yarn are impregnated on the foulard at 25° C. with a solution of 3 parts by weight of the quaternized dyestuff dissolved in 1000 parts by weight of water, squeezed and dried at 60–70° C. The yarn is then boiled with a solution of 5 g./litre of sodium carbonate for 15 minutes. The shade changes very rapidly from turquoise blue to bluish grey. The material is then strongly after-soaped.

Example 4

(a) Into 140 parts by volume of approximately 90% commercial formic acid there are introduced with stirring 14 parts by weight of a mixed copper phthalocyanine obtainable by known methods from 2 mols of phthalic acid and 2 mols of pyridine-2,3-dicarboxylic acid, and 14 parts by weight of dimethyl sulphate. The mixture is then stirred at 100° C. for 2 hours. After cooling, the blue solution of the quaternary compound thus formed is stirred into 700 parts by volume of ether or acetone, the separated blue dyestuff is filtered off with suction, washed with ether or acetone and dried. The yield is 19 parts by weight.

Instead of dimethyl sulphate there may also be used an equivalent amount of diethyl sulphate.

(b) 10 parts by weight of the quaternized dyestuff are heated to boiling temperature in 100 parts by weight of a 10% potassium hydroxide solution for 10 minutes. A navy blue dyestuff pigment is thus obtained.

(c) A cotton fabric is impregnated on the foulard at 25° C. with a solution of 20 parts by weight of the quaternized dyestuff in 1000 parts by weight of water, squeezed and dried at 60–70° C. The fabric is then boiled with a solution of 5 g./litre of sodium carbonate for 15 minutes. The shade changes very rapidly from greenish blue to grey. The material is then strongly after-soaped.

Example 5

(a) Into 100 parts by volume of approximately 90% commercial formic acid there are introduced with stirring 11.6 parts by weight of Bz-tetra-aza-copper phthalocyanine and 15.5 parts by weight of benzyl chloride. The mixture is then stirred at 100° C. for 3 hours. The quaternary compound thus formed is isolated as described in Example 1. The yield is 19 parts by weight.

(b) 10 parts by weight of the quaternized dyestuff are heated to boiling temperature in 100 parts by weight of 10% potassium hydroxide solution for 10 minutes. A navy blue pigment is thus obtained.

Example 6

(a) Into 100 parts by volume of approximately 90% commercial formic acid there are introduced with stirring 13 parts by weight of Bz-tetra-aza-copper phthalocyanine (2/100 mol) and 4 parts by weight of epichlorhydrin (4/100 mol). The mixture is then stirred at 100° C. for 2 hours and the quaternary compound thus formed is isolated according to Example 1. The yield is 15 parts by weight.

(b) 10 parts by weight of the quaternized dyestuff are heated to boiling temperature in 100 parts by weight of a 10% potassium hydroxide solution for 10 minutes. A violet pigment is thus obtained.

Example 7

(a) Into 100 parts by volume of approximately 90% commercial formic acid there are introduced with stirring 11.5 parts by weight of Bz-tetra-aza-nickel phthalocyanine (2/100 mol) and 3.8 parts by weight of dimethyl sulphate. After stirring at 100° C. for 2 hours, the quaternary compound thus formed is isolated according to the process described in Example 1. The yield is 15 parts by weight.

(b) 10 parts by weight of the quaternized dyestuff are heated to boiling temperature in 100 parts by weight of a 10% potassium hydroxide solution for 10 minutes. A violet pigment is thus obtained.

(c) A cotton fabric is impregnated on the foulard at 25° C. with a solution of 15 parts by weight of the quaternized dyestuff in 1000 parts by weight of water, squeezed and dried at 60–70° C. The fabric is then boiled with a solution of 3 g./litre of sodium carbonate for 15 minutes. The shade changes from blue to violet. The fabric is then strongly after-soaped.

(d) If instead of 3.8 parts by weight there are used 7.6 parts by weight of dimethyl sulphate, a similar quaternary compound is obtained.

(e) 10 parts by weight of the quaternized dyestuff are heated to boiling temperature in 100 parts by weight of a 10% potassium hydroxide solution for 10 minutes. A brownish violet pigment is thus obtained.

(f) If instead of 11.5 parts by weight of Bz-aza-nickel-phthalocyanine there are used 11.6 parts by weight of Bz-aza-copper phthalocyanine, a water-soluble dye stuff of similar properties is obtained.

(g) 10 parts by weight of the quaternized dyestuff are heated to boiling temperature in 100 parts by weight of a 10% potassium hydroxide solution for 10 minutes. A violet pigment is thus obtained.

(h) 100 parts by weight of cotton yarn are treated in a solution of 2 parts by weight of the quaternized dyestuff in 2000 parts by weight of water at raising temperature for 30 minutes and then at 90° C. for a further 15 minutes. After rinsing, the yarn is boiled with soap with a solution of 3 g./litre of soap and 10 cc./litre of sodium hydroxide solution at 30° Bé. for 30 minutes. The shade changes from greenish blue to greyish violet.

*Example 8*

(a) Into 100 parts by weight of approximately 90% commercial formic acid there are introduced 11.6 parts by weight of Bz-tetra-aza-cobalt phthalocyanine (2/100 mol) and 5.1 parts by weight of dimethyl sulphate (4/100 mol) and the mixture is stirred at 100° C. for 3 hours. The blue solution is then stirred into 250 parts by volume of ether or acetone. The separated blue dyestuff is filtered off with suction, washed with ether or acetone and dried. The yield is 15 parts by weight.

(b) 100 parts by weight of cotton yarn are treated in a solution of 2 parts by weight of the quaternized dystuff in 2000 parts by weight of water at raising temperature for 30 minutes and then at 90° C. for a further 15 minutes. After rinsing, the material is boiled with soap with a solution of 3 g./litre of soap and 10 cc./litre of a sodium hydroxide solution 38° Bé. for 30 minutes. The shade changes from grey to greyish brown.

*Example 9*

Into 100 parts by volume of approximately 90% commercial formic acid there are introduced 12 parts by weight of metal-free Bz-tetra-aza-phthalocyanine obtainable from pyridine-2,3-dicarboxylic acid dinitrile by known methods, and 12 parts by weight of dimethyl sulphate, and the mixture is stirred at 100° C. for ¼ hour. The blue solution is then stirred into 250 parts by volume of ether or acetone and the separated blue dyestuff is filtered off with suction, washed with ether or acetone and dried. The yield is 16 parts by weight. The dyestuff shows the properties described in Example 1.

We claim:
1. A dyestuff of the formula

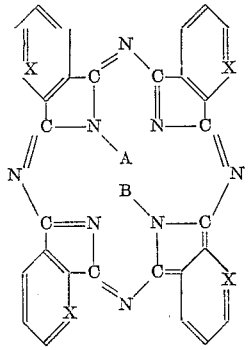

wherein A and B are selected from the group consisting of two H's, when considered individually, and a phthalocyanine-complexing metal atom when considered in combination; and X is a member selected from the group consisting of a quaternized nitrogen atom and CH, at least two X's being quaternized nitrogen atoms.

2. A product obtained by heating a dyestuff of claim 1 until an insoluble pigment is obtained.

3. A process for obtaining an insoluble pigment which comprises subjecting to a heat treatment a dyestuff of claim 1.

4. The process of claim 3 wherein the heat treatment comprises boiling an aqueous solution of the dyestuff in the presence of alkali.

5. A process for dyeing textiles which comprises applying to said textiles a dyestuff of claim 1 and then subjecting the treated textile to a heat treatment.

6. A process for dyeing textiles which comprises impregnating the textile fiber with a dyestuff of claim 1 and then boiling the impregnated textile in an alkali solution until a color change is effected.

7. A textile material colored according to the process of claim 5.

UNITED STATES PATENTS

| 2,464,806 | Haddock | Mar. 22, 1949 |
| 2,542,327 | Haddock | Feb. 20, 1951 |
| 2,681,345 | France | June 15, 1954 |

FOREIGN PATENTS

| 696,590 | Germany | Sept. 25, 1940 |

OTHER REFERENCES

Vankataraman: "The Chemistry of Synthetic Dyes," pages 1138–1140, vol. II, pub. 1952 by Academic Press.